Jan. 12, 1971   J. F. BATTER, JR., ET AL   3,554,643
EXPOSURE SYSTEM

Filed Aug. 28, 1968   3 Sheets-Sheet 1

INVENTORS
John F. Batter, Jr.
and
BY   Joseph A. Stella
Brown and Mikulka
and
Alfred E. Corrigan
ATTORNEYS Jan. 12, 1971   J. F. BATTER, JR., ET AL   3,554,643
EXPOSURE SYSTEM Filed Aug. 28, 1968   3 Sheets-Sheet 2

INVENTORS
John F. Batter, Jr.
and
Joseph A. Stella
BY
Brown and Mikulka
and
Alfred E. Corrigan
ATTORNEYS

United States Patent Office 3,554,643
Patented Jan. 12, 1971

3,554,643
EXPOSURE SYSTEM
John F. Batter, Jr., Lincoln, and Joseph A. Stella, Peabody, Mass., assignors to Polaroid Corporation, Cambridge, Mass., a corporation of Delaware
Filed Aug. 28, 1968, Ser. No. 756,010
Int. Cl. G03b 27/54, 27/00
U.S. Cl. 355—65                                    10 Claims

ABSTRACT OF THE DISCLOSURE

A document copier exposure system including a pair of light sources having baffles located within a chamber, the chamber including a pair of reflecting surfaces and a window for supporting an original in position for exposure such that the intensity of the light incident upon the original decreases inwardly toward the center thereof. The light sources and the reflecting surfaces are positioned such that the latter form multiple virtual images of each of the light sources appearing to the window to be located outside of the chamber.

---

Photographic apparatus of the type comprehended by the present invention generally includes means for exposing successive areas of a light-sensitive, image-recording sheet to light from a subject, such as a document, page of a book, photograph, etc.; cutting the exposed, image-recording sheet into sections each including an exposed area; and treating each of the sections with a liquid processing agent to form a visible (positive) image of the subject. The exposure system of the apparatus generally comprises means for supporting successive sections of the photosensitive sheet in position for exposure, means for locating a subject in position for exposure, means for illuminating the subject, and an optical system including an objective lens for producing an image of the subject on the section of the photosensitive sheet positioned for exposure. The processing system includes means for severing each exposed section of the photosensitive sheet from the remainder of the sheet and applying a liquid processing agent to the exposed area of each section to effect visible image formation.

An object of the invention is to provide, in photographic apparatus of the type described including support means for supporting an original in position for exposure and a source of light for exposing the original, novel and improved means for directly illuminating the corners of the original and indirectly illuminating the whole thereof thereby decreasing the intensity of the light incident upon the original inwardly toward the center thereof while simultaneously preventing any light from the source from being reflected by the support means directly to the lens of the apparatus.

Another object of the invention is to provide, in apparatus as described including an exposure chamber having support means in the form of a window for positioning graphic material for exposure and a pair of light sources for exposing the graphic material, reflecting means for reflecting light from the light sources onto the window, the light sources and the reflecting means being positioned such that the reflecting means form multiple virtual images of each of the light sources, the virtual images appearing to the window to be located outside of the chamber.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
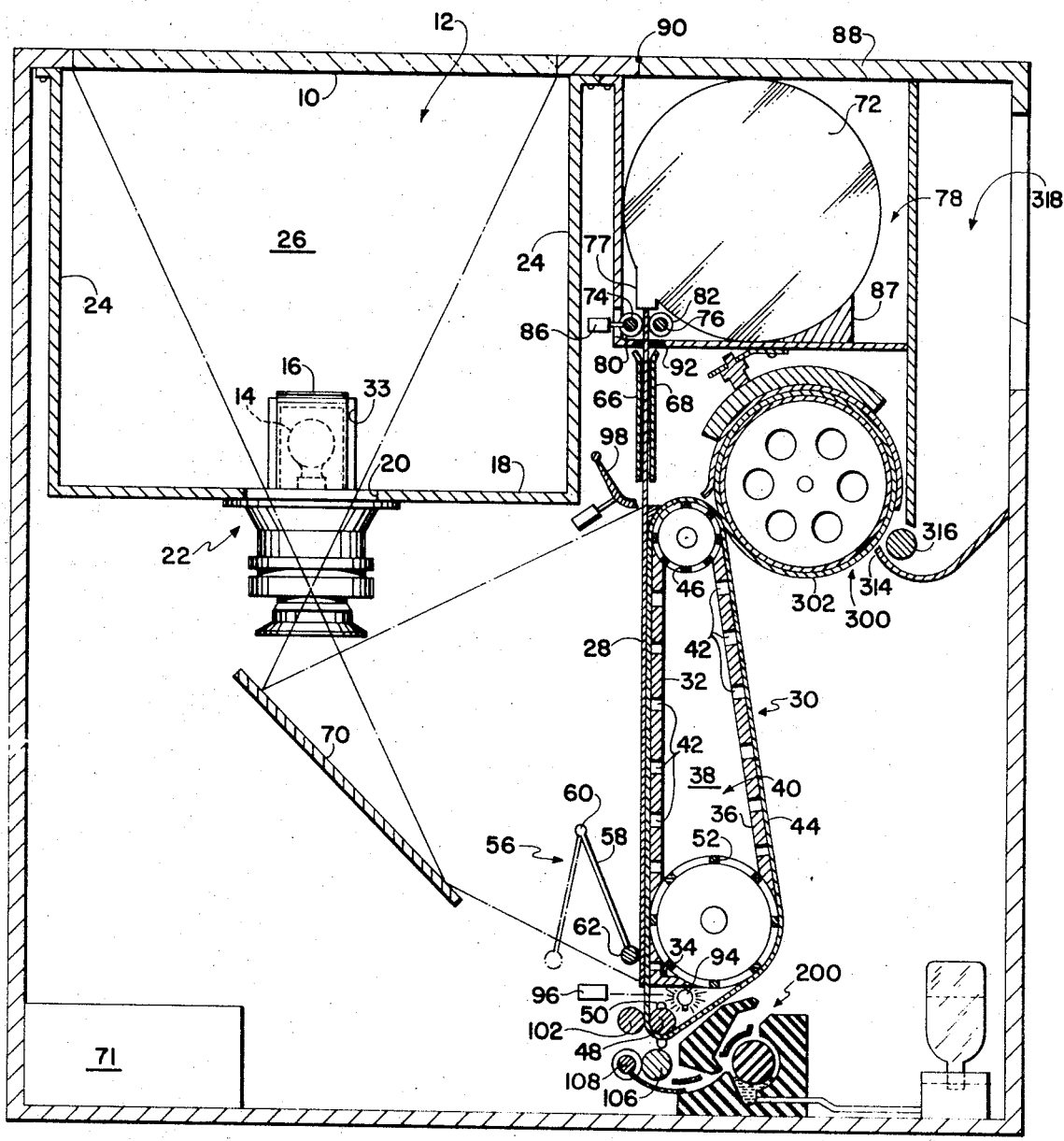
FIG. 1 is a sectional, elevational view of photographic document copying apparatus embodying the invention.

The document copying apparatus embodying the instant invention is shown in FIG. 1 as including an exposure system comprising a generally planar light-transmitting section or window 10 comprising one end wall of a chamber 12 in which are mounted lamps 14 for illuminating an original document positioned for exposure on the upper surface of window 10 and baffle means 16. The chamber is defined by an end wall 18 located towards the other end of chamber 12 from window 10, said wall being provided with a centrally located opening 20 in which is mounted an image-forming means, e.g., an objective lens, and shutter assembly 22 of a conventional type employed in photography and two pairs of parallel opposed, planar side walls 24, 26 which define opposite sides of chamber 12. The apparatus is primarily intended to photograph rectangular subjects and accordingly, window 10 is rectangular in shape having length and width dimensions at least equal to those of the largest document, e.g., 8½ x 14 inches, usually reproduced.

Means are provided for supporting successive areas of a light-sensitive, image-recording sheet designated 28, in position for exposure to light from an original positioned on window 10, transmitted by lens 22. These means include a housing 30 comprised of a substantially planar wall 32, located adjacent the focal plane of the lens, walls 34, 36 and end members 38, only one of which is shown, all of which cooperate to form a chamber 40. Walls 32 and 36 are substantially of the same width as sheet 28 and are provided with a plurality of apertures 42. An endless perforated belt 44 mounted on a drive roll 46, an adjustable tensioning roll 48, mounted for movement in slot 50 and a freely rotatably mounted cylindrical member 52 encompasses the chamber 40. Belt 44, which is perforated throughout to make it substantially pervious to air, is formed of any suitable material such as an organic plastic sheet, for example, a film of polyethylene terephthalate resin, and is of substanitally the same width as walls 32 and 36, drive roll 46 and member 52. Blower means (not shown) are mounted on one of the side walls 38 for reducing the pressure within chamber 40 to hold the photosensitive sheet 28 against belt 44, i.e., the lower pressure within chamber 40 acts upon sheet 28 by virtue of apertures 42 and the perforations in belt 44.

As can be seen in FIG. 1, a section of photosensitive sheet 28 is held in position for exposure by a generally U-shaped member 56, the legs 58 of which are pivotally attached at their free ends to suitable support means by pivot means 60. The other ends of legs 58 are connected by a member 62 having a plurality of resilient discs mounted thereon. U-shaped member 56 is spring biased against the lower end of the sheet 28 such that the resilient members contact the bottom portion of the section of the photosensitive sheet 28 and hold it against wall 32. A rotary solenoid is coupled to member 56 for pivoting it to the dotted line position shown in FIG. 1. The upper portion of the section of photosensitive sheet 28 is maintained in place by guide members 66, 68.

A planar mirror 70 is arranged substantially at a 45° angle with respect to the axis of lens 22 and the plane of wall 32 for redirecting light from the lens toward the wall 32 and the section of photosensitive sheet 28 positioned thereon, and producing the geometric image reversal required for a correct copy of the original. Located below the mirror 70 is a compartment 71 for housing controls of the apparatus.

Photosensitive sheet 28 is supplied coiled upon a spool mounted within a conventional cassette 72 mounted above (as viewed in FIG. 1) housing 30. Cassette 72 is provided with a conventional friction drag to retard rotation of the spool when the feeding of sheet 28 from cassette 72 has been stopped. Cassette 72 is provided with a neck portion 77, having suitable light shield means therein, from which a portion of sheet 28 originally protrudes. Feed roll 74 is opsitioned adjacent an idler roll 76 located within chamber 78 and each of the rolls is provided with a plurality of axially spaced members 80 and 82, respectively. To load cassette 72 into chamber 78, a door 88, hinged about 90, is pivoted to the open position and the cassette positioned within compartment 78 such that the neck portion 77 is located between rolls 74 and 76 and is in alignment with an opening 92 in chamber 78. Any suitable means such as block 87 may be provided to facilitate the proper positioning of cassette 72.

After cassette 72 has been loaded into compartment 78, a solenoid 86 is actuated to move feed roll 74 to a position in which sheet 28 is gripped between rolls 74 and 76 and drive roll 74 is actuated to withdraw a section of sheet 28 from cassette 72. The leading edge of sheet 28 is advanced downwardly (as viewed in FIG. 1) until it interrupts a beam of light being emitted by lamp 94 and directed through belt 44 via an endless slot (not shown) positioned intermediate the sides of the belt 44 toward a photocell 96. When the light falling on the photocell is interrupted a circuit is opened allowing roll 74 to move away from roll 76 thereby stopping the feed of sheet 28. A portion of photosensitive sheet 28 is now properly positioned on wall 32 for exposure.

In photographic apparatus of the foregoing type, it has been found that a certain amount of vignetting occurs along the outer edges of the section of photosensitive sheet 28 positioned adjacent wall 32 when the material supported by window 10 is exposed. This vignetting or darkening, is due in part to the fact that a light ray emanating from lamp 14 and directed towards an opposite end of an original positioned for exposure on window 10, must travel further than one directed at a center portion of the original or document, thereby having less energy (ability to photographically expose the original) than a ray directed toward the center portion. In other words, the intensity of the light incident upon window 10 by lamps 14 ordinarily diminishes as you move from the center of window 10 outwardly towards the ends and sides thereof. Needless to say, this vignetting is undesirable in that it reduces the effective area of the sheet positioned adjacent wall 32 which is available for reproducing the image of the object placed on window 10. Also, the total length of the light path, i.e., lamp to original to lens to film, varies, as does the angle of incidence of light causing light fall-off also called "$\cos^4$ fall-off."

Figure 2:
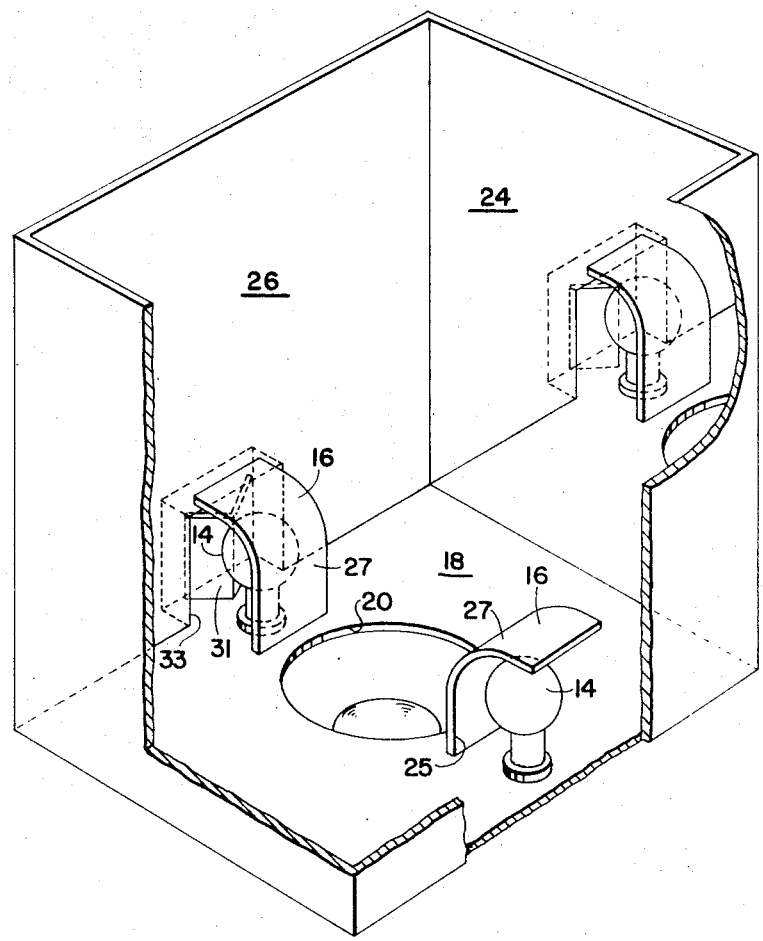
FIG. 2 is a perspective view of the exposure chamber employed in the photographic document copying apparatus.
Figure 3:
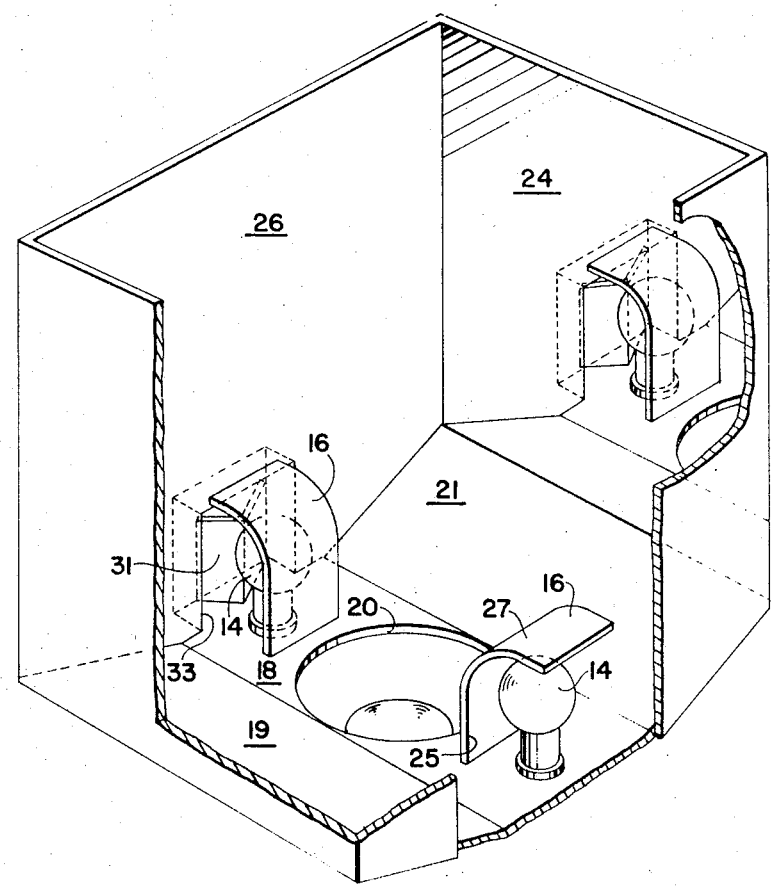
FIG. 3 is a perspective view of a modified version of the exposure chamber of FIG. 2.

To obviate this problem there is provided a structure comprised of two baffles 16 each of which is positioned between one of the lamps 14 and light-transmitting section 10 and lens and shutter assembly 22. Each of the baffles is provided with a reflecting surface 25 facing lamp 14 and a nonreflecting surface 27. Surface 25 may be a highly polished metal finish, e.g., aluminum, or it may be provided with a coat of white pigment. Surfaces 27 and wall 18 may be coated with a black or a nonreflecting material to decrease the possibility of scattered light reaching window 10. Alternatively, the area of wall 18 located directly below baffle 16, i.e., the area of wall 18 which lies between the vertical leg (as viewed in FIGS. 2 and 3) of baffle 16 and wall 26 may be provided with a reflecting surface, e.g., white paint or highly polished metal. This will provide the corners of window 10 with additional light which would otherwise be absorbed by end wall 18. Also, wall 18 could be sloped by approximately 5°–15° to form an acute angle with window 10 as shown at 19 and 21 in FIG. 3 to further reduce the amount of scattered light reaching window 10. Baffles 16 are positioned adjacent walls 26 which are provided with an absorptive type finish, e.g., black flocking, and between walls 24 which have a mirror-like finish for reflecting light emanating from the lamps 14 onto window 10. Second reflecting means 31 (only one of which is shown) are mounted within a recess 33 formed in each of the walls 26, each of the reflectors being provided for increasing the intensity of the light incident upon window 10 by reflecting light from lamp 14 onto window 10 which would otherwise be absorbed by the nonreflecting surface of walls 26.

The arrangement of the lamps, baffles and the walls of exposure chamber 12 is such that the mirror-like finishes of walls 24 form multiple (at least two) virtual images of each of the lamps 14, each image appearing to window 10 to be located outside the chamber 12. It can be seen from the foregoing that if one were to reproduce an exposure chamber similar to that shown at 12 with real lamps being located at the positions that the virtual images of lamps 14 appear to be, the exposure chamber would have to be considerably larger. Accordingly, by proper positioning of the two lamps 14 and the mirror-like surfaces 24, it is possible to simulate, to an original positioned on window 10, an exposure chamber having a lamp in each of its four corners and recreate this effect within a smaller area. It should be noted at this point that the width of each of the baffles 16, as measured along wall 26, is such as to prevent any light from being reflected directly from the lamp 14 to window 10 and then to the lens and shutter assembly 22, while simultaneously allowing the corners of window 10 to receive direct illumination. By blocking the amount of direct illumination incident upon window 10, we obtain an illumination pattern wherein the intensity of the light incident upon window 10 increases outwardly from the center thereof. Lamps 14 are preferably of the ordinary diffuse household type because they are readily accessible and because of their relative low cost although it is possible to use a nondiffuse source of light.

After the section of sheet 28 supported by wall 32 has been exposed it is moved downwardly (as viewed in FIG. 1) by belt 44 to a position between rolls 48 and 102 from whence it is directed away from the belt 44 and into the bite of a pair of rolls 106, 108. From rolls 106, 108 the exposed section is passed through a liquid applicator 200 of the reverse roll type whereat a layer of processing liquid is applied to the exposed section of photosensitive sheet 28.

The liquid processing composition is applied to one side of the exposed photosensitive sheet 28 for permeation into the sheet to effect the formation of a visible image. The applicator 200 is designed to apply a predetermined quantity of a nonviscous liquid to the exposed side of the photosensitive sheet, preferably to effect image formation by a silver halide diffusion transfer process. For examples of such processes and the materials useful therein, reference may be had to copending U.S. applications Ser. No. 519,995 of Edwin H. Land, and Ser. No. 519,884 of Edwin H. Land et al., both filed Jan. 1, 1966.

The processing liquid may be nonviscous, i.e., have the viscosity of water, or it may include a film forming agent and range in viscosity from that of water to a viscosity of 200,000 centipoises at 20° C.

The thus treated exposed section is then redirected back onto belt 44 which carries it to a rotating mangle-type dryer 300 to complete the drying of the treated exposed section. The exposed section is then removed from the rotating drum 302 of dryer 300 by a member 314 and delivered by a counterclockwise (as viewed in FIG. 1) rotating roll 316 to a compartment 318 whereat it is readily available to the operator of the apparatus.

During this time the leading edge of the unexposed section of sheet 28 is approaching photocell 96. Photocell 96 is of the type which has a memory and this memory is awaken when light from lamp 94 falls upon it. It will be recalled that when the leading edge of sheet 28 first interfered with the passage of light between lamp 94 and cell 96, solenoid 86 was actuated to move roll 74 out of contact with sheet 28. In other words when cell 96 does not see lamp 94 the drive roll 74 is in the inoperative position. However, this condition must not exist at every stage in the operation of the apparatus because we want roll 74 to be feeding sheet 28 into the focal plane when the exposed section of sheet 28 is being fed between lamp 94 and the photoelectric cell 96. Accordingly, by installing suitable relays in the photocell's circuit the photocell can be made to be nonresponsive to the absence of light from lamp 94, until such time as it receives light from the lamp. Since there is a small delay in time between actuation of knife 98 and the movement of roll 74 into contact with sheet 28, there is a small gap between the trailing edge of the severed section and the leading edge of sheet 28. When this gap is located between lamp 94 and photoelectric cell 96 the cell is made responsive to the absence of light from lamp 94. Therefore, when the leading edge of the unexposed section of sheet 28 is located between lamp 94 and cell 96 solenoid 86 is again actuated to stop any further feeding of the sheet into the focal plane.

From the foregoing it is apparent that there has been disclosed a novel exposure chamber for photographic apparatus, one which is able, with only two light sources, to simulate a chamber having at least four light sources without sacrificing much needed space and one which provides for uneven illumination at the plane of the original in order to obtain even illumination at the focal plane.

Since certain changes may be made in the above apparatus without departing from the scope of the invention herein involved, it is intended that all matter contained in the above description or shown in the accompanying drawings shall be interpreted as illustrative and not in a limiting sense.

We claim:

1. Photographic apparatus for exposing a photosensitive image-recording medium supported in position for exposure, comprising, in combination:
   means defining a chamber having end walls and at least two pairs of opposed side walls, the length of one pair of side walls being greater than the width of the other pair of side walls;
   one of said end walls including a light-transmitting section substantially centered with respect to said side walls for supporting graphic material in position for exposure;
   image-forming means located toward the other end wall of said chamber for producing an image of graphic material supported on said light-transmitting section at a photosensitive image-recording medium supported in position for exposure at a location remote from said image-forming means and outside of said chamber;
   a pair of light sources within said chamber located adjacent one pair of said side walls on opposite sides of said image-forming means;
   baffle means interposed between said light sources and said light-transmitting section and said image-forming means in position to prevent light from said sources from falling directly on said image-forming means and being reflected directly from said light-transmitting section to said image-forming means while permitting light from said sources to directly illuminate the extremities of said light-transmitting section;
   nonreflecting means located on said one pair of walls; and
   reflecting means located adjacent each of the other pair of said side walls for reflecting light propagated by each of said sources from opposite sides of said chamber onto said light-transmitting section with decreasing intensity of said light incident upon said light-transmitting section inwardly toward the center thereof, said light sources and said reflecting means being located such that the latter form multiple virtual images of each of said light sources appearing to said light-transmitting section to be located outside of said chamber.

2. Photographic apparatus as defined in claim 1 wherein said light sources are enlarged, diffuse sources.

3. Photographic apparatus as defined in claim 2 wherein said reflecting means are planar.

4. Photographic apparatus as defined in claim 2 wherein said diffuse sources are generally spherical.

5. Photographic apparatus as defined in claim 2 further including second reflecting means positioned between said light sources and said one pair of side walls for increasing the intensity of the light incident upon said light-transmitting section.

6. Photographic apparatus as defined in claim 1 wherein one of said end walls includes portions each defining an acute angle with said light-transmitting section.

7. Photographic apparatus as defined in claim 1 wherein at least the walls of one pair of said opposed side walls are planar.

8. Photographic apparatus for exposing a photosensitive image-recording medium supported in position for exposure, comprising, in combination:
   means defining a chamber having end walls and at least two pairs of opposed side walls;
   one of said end walls including a light-transmitting section substantially centered with respect to said side walls for supporting graphic material in position for exposure;
   image-forming means located toward the other end wall of said chamber for producing an image of graphic material supported on said light-transmitting section at a photosensitive image-recording medium supported in position for exposure at a location remote from said image-forming means and outside of said chamber;
   a pair of diffuse light sources within said chamber located adjacent one pair of said side walls on opposite sides of said image-forming means;
   baffle means interposed between said light sources and said light-transmitting section and said image-forming means in position to prevent light from said sources from falling directly on said image-forming means and being reflected directly from said light-transmitting section to said image-forming means while permitting light from said sources to directly illuminate the extremities of said light-transmitting section;
   reflecting means located adjacent each of the other pair of said side walls for reflecting light propagated by each of said sources from opposite sides of said chamber onto said light-transmitting section with decreasing intensity of said light incident upon said light-transmtting section inwardly toward the center thereof, said light sources and said reflecting means being located such that the latter form multiple virtual images of each of said light sources appearing to said light-transmitting section to be located outside of said chamber; and
   second reflecting means positioned between said light sources and said one pair of side walls for increasing the intensity of the light incident upon said light-transmitting section, said one pair of side walls of said chamber including nonreflecting surfaces disposed between said first-mentioned reflecting means and adjacent said light sources, said nonreflecting surfaces including recessed portions for housing said second reflecting means.

9. Photographic apparatus as defined in claim 8 wherein said side walls are planar and perpendicular to each other and to said end walls.

10. Photographic apparatus as defined in claim 9 wherein said second reflecting means are planar and are mounted perpendicular to said end walls.

References Cited

UNITED STATES PATENTS

| 2,602,370 | 7/1952 | Dodin | 355—70 |
| 3,272,066 | 9/1966 | Rice | 355—70 |
| 3,428,397 | 2/1969 | Elmer | 355—70X |

JOHN M. HORAN, Primary Examiner

R. A. WINTERCORN, Assistant Examiner

U.S. Cl. X.R.

355—70